US012799996B2

(12) United States Patent
Shahin et al.

(10) Patent No.: US 12,799,996 B2
(45) Date of Patent: Nov. 17, 2026

(54) DRUM BRAKE

(71) Applicant: HL MANDO CORPORATION, Pyeongtaek (KR)

(72) Inventors: Hatem Shahin, Pfaffenhofen (DE); Florian Weicher, Wiesbaden (DE); Moritz Riemer, Waldems (DE); Volker Kinder, Russelsheim (DE)

(73) Assignee: HL Mando Corporation, Pyeongtaek (KR)

(*) Notice: Subject to any disclaimer, the term of this patent is extended or adjusted under 35 U.S.C. 154(b) by 322 days.

(21) Appl. No.: 18/605,557

(22) Filed: Mar. 14, 2024

(65) Prior Publication Data

US 2025/0092928 A1 Mar. 20, 2025

(30) Foreign Application Priority Data

Sep. 20, 2023 (DE) ......................... 102023125470.7

(51) Int. Cl.

| | |
|---|---|
| ***F16D 51/18*** | (2006.01) |
| ***F16D 65/00*** | (2006.01) |
| ***F16D 65/08*** | (2006.01) |

(52) U.S. Cl.

CPC ............ *F16D 65/08* (2013.01); *F16D 51/18* (2013.01); *F16D 65/0006* (2013.01); *F16D 2200/003* (2013.01)

(58) Field of Classification Search

CPC ...... F16D 65/08; F16D 51/18; F16D 65/0006; F16D 2200/003; F16D 65/09; B60T 1/067

See application file for complete search history.

(56) References Cited

U.S. PATENT DOCUMENTS

| | | | | |
|---|---|---|---|---|
| 1,794,348 A | | 2/1931 | Chase | |
| 1,923,872 A | * | 8/1933 | Loughead | F16D 65/08 188/264 R |

FOREIGN PATENT DOCUMENTS

| | | | | | |
|---|---|---|---|---|---|
| CN | 214221841 U | * | 9/2021 | | F16D 65/08 |
| DE | 4212536 A1 | | 10/1992 | | |
| JP | 2002174277 A | * | 6/2002 | | F16D 65/06 |
| JP | 6795426 B2 | | 12/2020 | | |
| KR | 10-2016-0059357 A | | 5/2016 | | |
| KR | 10-2017-0041028 A | | 4/2017 | | |
| WO | WO-9848192 A1 | * | 10/1998 | | F16D 65/08 |

OTHER PUBLICATIONS

Wikipedia: Invar material, pp. 1-6, filed Apr. 18, 2026. (Year: 2026).*

DE OA dated May 31, 2024.

* cited by examiner

*Primary Examiner* — Tisha D Lewis

(74) *Attorney, Agent, or Firm* — Harvest IP Law, LLP

(57) ABSTRACT

The drum brake includes: a drum configured to rotate together with a wheel; a pair of brake shoes positioned inside the drum and configured to move to an inner circumferential surface of the drum by a wheel cylinder; and a pad attached to an outer circumferential surface of each brake shoe and configured to rub against the inner circumferential surface of the drum when the brake shoe operates outward, wherein the brake shoe includes an expansion portion made of a material that expands thermally in a radial direction and configured to compensate a gap formed between the pad and the drum expanding thermally.

12 Claims, 11 Drawing Sheets

DRUM BRAKE

CROSS-REFERENCE TO RELATED APPLICATION

This application claims the benefit of German Patent Application No. 102023125470.7, filed on Sep. 20, 2023 in the German Patent Office (DPMA), the disclosures of which are incorporated herein by reference in its entirety.

BACKGROUND

1. Technical Field

The disclosure relates to a drum brake, and more particularly, to a drum brake for improving brake performance against thermal expansion of a drum.

2. Description of the Related Art

Brake systems for brake are essential to vehicles. Representative brake systems are a drum brake and a caliper brake.

The drum brake includes a drum rotating together with a wheel, and brake shoes. Accordingly, the drum brake generates, when the vehicle brakes, a frictional force by compressing the brake shoes from the inside of the drum toward the inner circumferential surface of the drum, and uses the frictional force as a braking force.

In contrast, while the vehicle travels, the drum brake allows the drum to rotate by spacing the brake shoes from the inner circumferential surface of the drum by a certain distance. That is, it is important to properly adjust the distance between the drum and the brake shoes in the drum brake.

The drum is generally made of a material that expands thermally, such as iron. Because the drum brake uses a frictional force as a braking force, the temperature and pressure inside the drum inevitably rise significantly when the vehicle brakes. Accordingly, when the vehicle brakes, the drum expands in the radial direction to form a gap between the inner circumferential surface of the drum and the brake shoes.

The gap prevents the brake shoes from completely contacting the drum. Accordingly, the noise and vibrations of the brake are generated upon braking of the vehicle and the braking force of the brake deteriorates, which may cause life damage of occupants of the vehicle and nearby pedestrians.

For this reason, a method for dealing with a drum that expands thermally in a drum brake is needed.

SUMMARY

It is an embodiment of the disclosure to provide a drum brake for preventing deterioration of brake performance.

It is an embodiment of the disclosure to provide a drum brake for preventing deterioration of brake performance, caused by thermal expansion of the drum brake.

It is an embodiment of the disclosure to provide a drum brake for preventing vibrations and noise caused by thermal expansion of the drum brake.

It is an embodiment of the disclosure to provide a drum brake for improving productivity and economy of the brake by preventing deterioration of brake performance through a simple structure.

Additional aspects of the disclosure will be set forth in part in the description which follows and, in part, will be obvious from the description, or may be learned by practice of the disclosure.

In accordance with an aspect of the disclosure, a drum brake includes: a drum configured to rotate together with a wheel; a pair of brake shoes positioned inside the drum and configured to move to an inner circumferential surface of the drum by a wheel cylinder; and a pad attached to an outer circumferential surface of each brake shoe and configured to rub against the inner circumferential surface of the drum when the brake shoe operates outward, wherein the brake shoe includes an expansion portion made of a material that expands thermally in a radial direction and configured to compensate a gap formed between the pad and the drum expanding thermally.

The brake shoe may further include a body portion made of a material that is different from a material of the expansion portion.

The expansion portion may be made of a material having relatively smaller stiffness and a relatively greater thermal expansion coefficient than the material of the body portion.

The body portion may be made of a material including iron, and the expansion portion may be made of a material including at least one of aluminum or copper.

The body portion may have a semicircular shape, and the expansion portion may extend in a circumferential direction to be positioned alongside of an outer circumferential surface of the body portion.

The expansion portion may be positioned inside the body portion.

A length in circumferential direction of the expansion portion may be shorter than a length in circumferential direction of the body portion, and a first space may be formed at an end of the expansion portion.

The expansion portion may include a plurality of expansion portions.

The plurality of expansion portions may be arranged in a radial direction.

The plurality of expansion portions may be spaced from each other such that the body portion is positioned between the plurality of expansion portions.

The plurality of expansion portions may be arranged in a circumferential direction.

The plurality of expansion portions may be spaced from each other such that a second space is formed between the plurality of expansion portions.

The body portion may have a semicircular shape, and the expansion portion may extend in a radial direction to be perpendicular to an outer circumferential surface of the body portion.

The expansion portion may be in contact with the pad at an end toward the pad.

The expansion portion may include a plurality of expansion portions formed with different lengths in a radial direction.

The plurality of expansion portions may be respectively made of materials having different thermal expansion coefficients.

The plurality of expansion portions may be respectively made of materials having different thicknesses.

An entire of the brake shoe may be the expansion portion.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EMBODIMENTS

Figure 1:
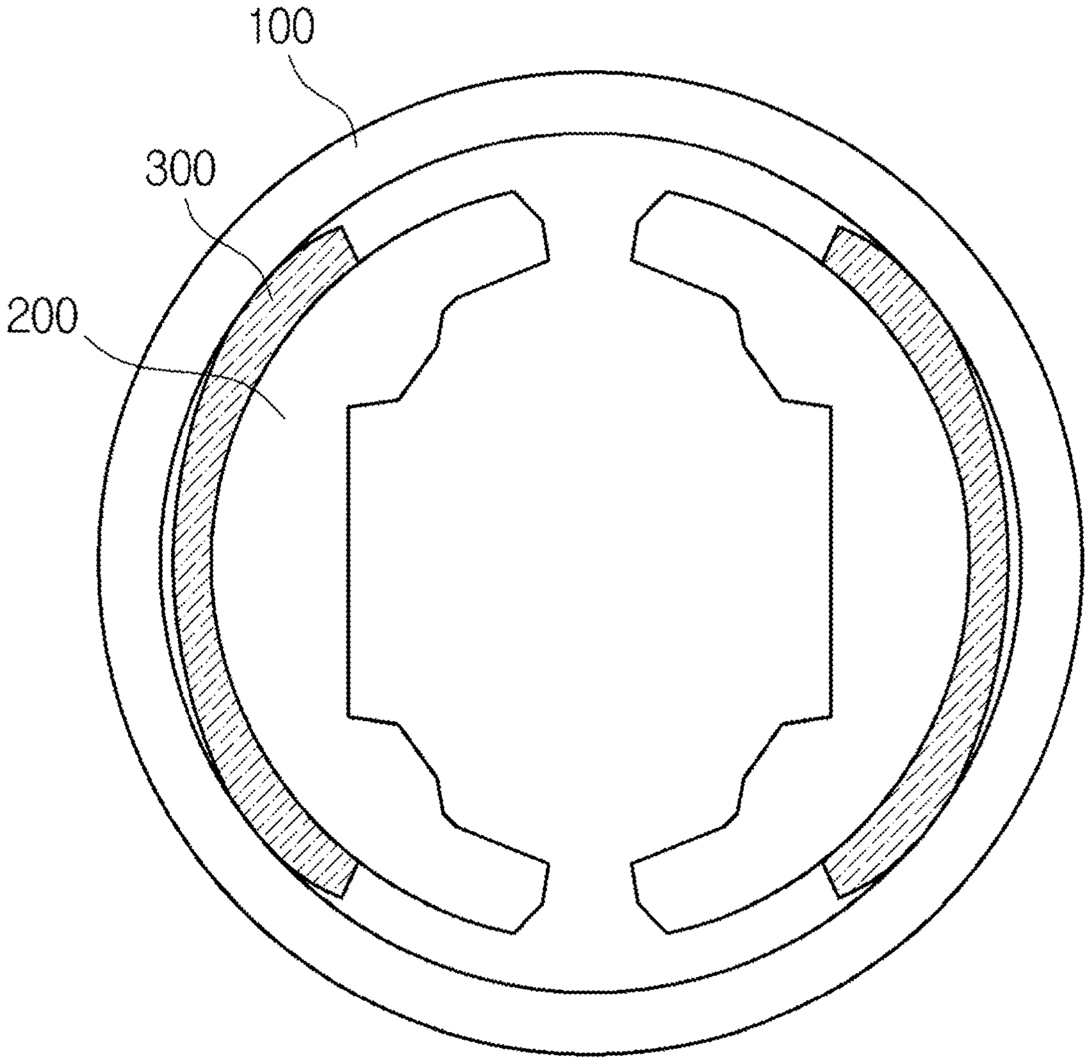
FIG. 1 [Prior Art]
FIG. 1 is a front view of an existing drum brake.

Hereinafter, embodiments will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a front view of an existing drum brake.

Referring to FIG. 1, the existing drum brake may include a drum 100, a brake shoe 200, and a pad 300.

The drum 100 may be installed in a wheel hub and rotate together with a wheel. Generally, the drum 100 may have a cylindrical shape and be made of cast iron.

A pair of brake shoes 200 may be provided and installed inside the drum 100. The brake shoe 200 may move to an inner circumferential surface of the drum 100 by a wheel cylinder when the brake operates.

The pad 300 may be a frictional material component that is in contact with the drum 100, and is also called a lining. The pad 300 may be attached to an outer circumferential surface of the brake shoe 200 to rub against the inner circumferential surface of the drum 100 when the brake shoe 200 operates outward.

The drum 100, the brake shoe 200, and the pad 300 may be general components of a drum brake and may be easily implemented by one of ordinary skill in the art based on known technology. Accordingly, detailed descriptions about the drum 100, the brake shoe 200, and the pad 300 will be omitted.

Figure 2:
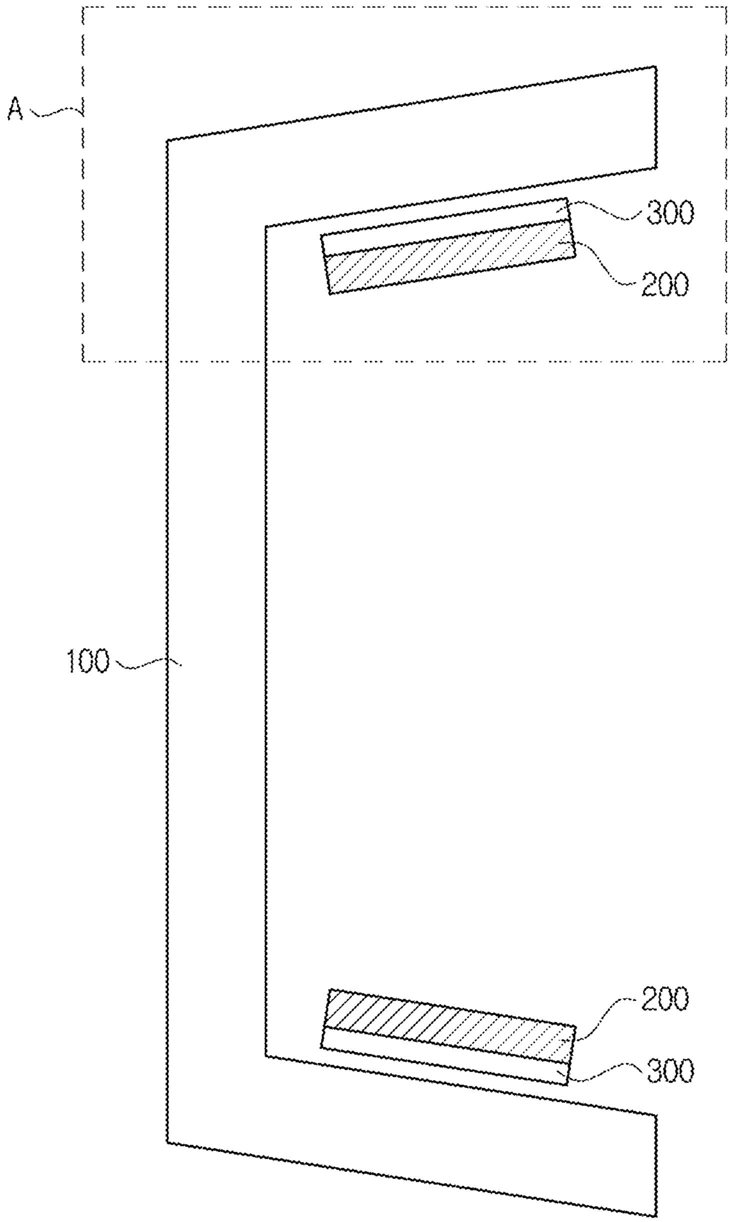
FIG. 2 [Prior Art]
FIG. 2 is a front view of the existing drum brake while a vehicle travels.
Figure 3:
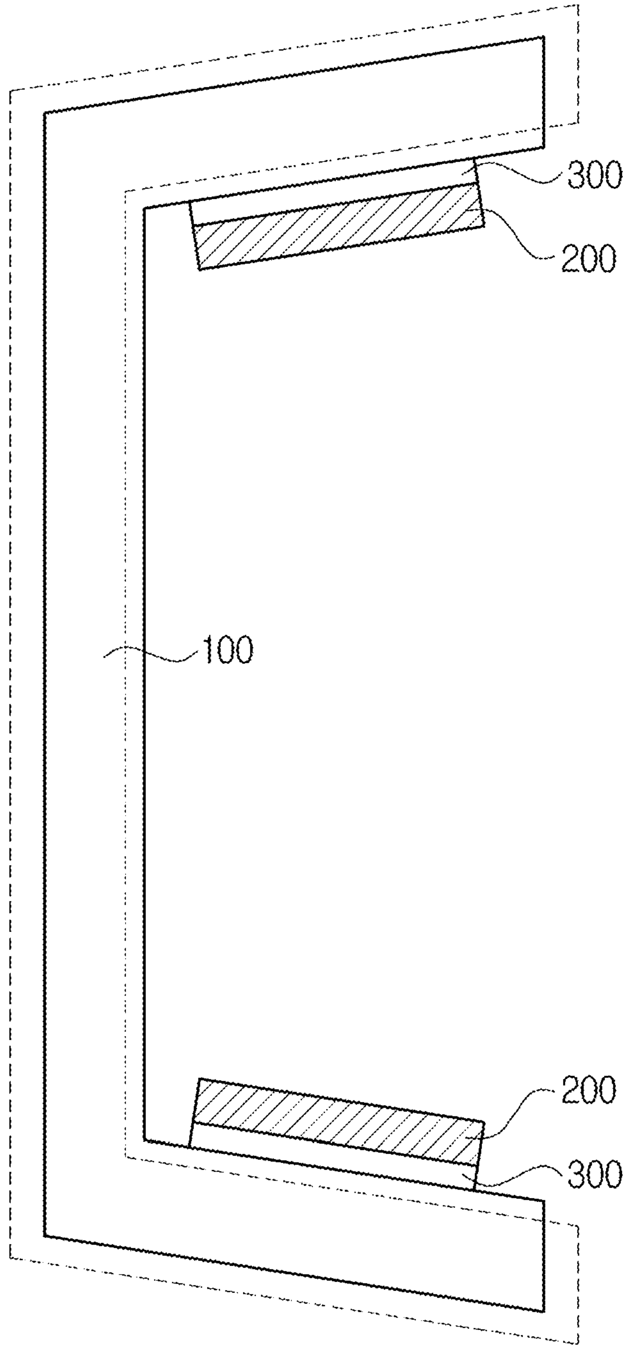
FIG. 3 [Prior Art]
FIG. 3 is a front view of the existing drum brake when the vehicle brakes.
Figure 4:
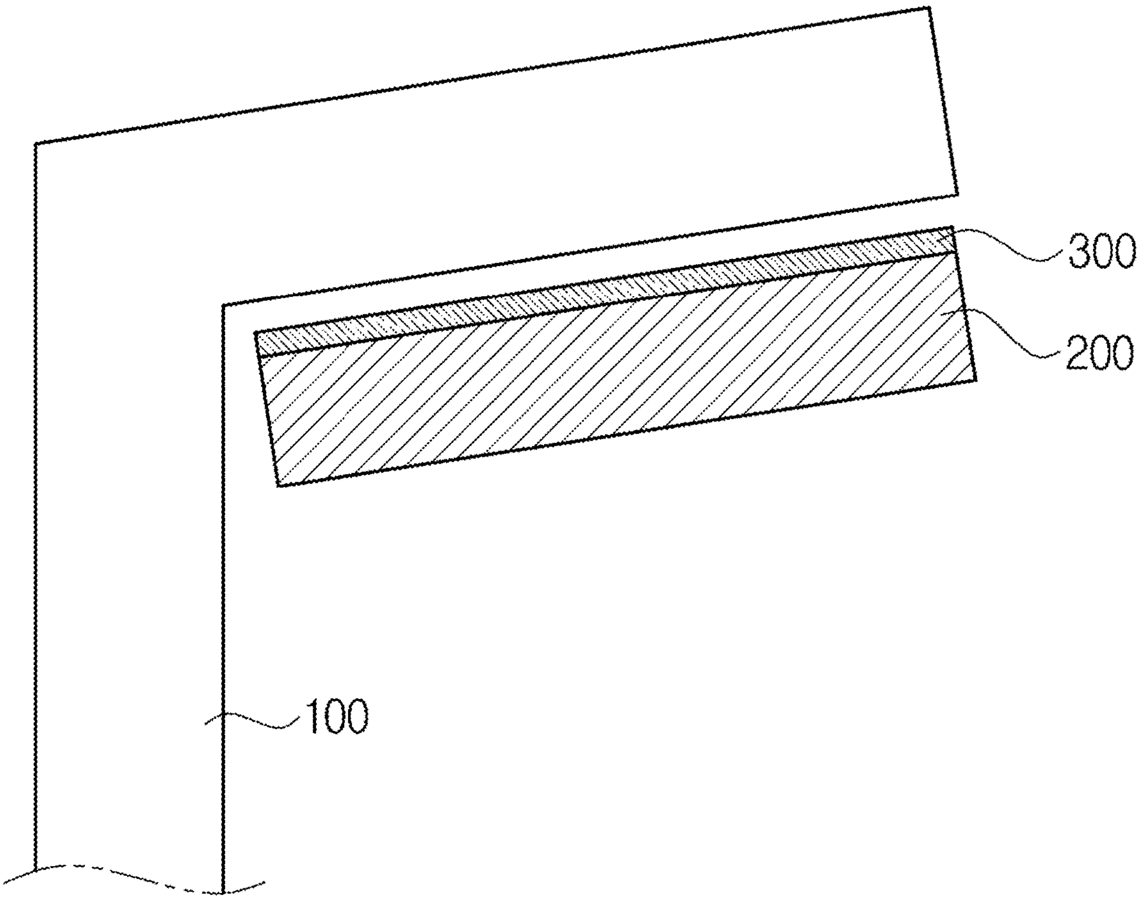
FIG. 4 [Prior Art]
FIG. 4 is an enlarged view of an A area of FIG. 2.

FIG. 2 is a front view of the existing drum brake while a vehicle travels, FIG. 3 is a front view of the existing drum brake when the vehicle brakes, and FIG. 4 is an enlarged view of an A area of FIG. 2.

Referring to FIGS. 2 and 4, when a vehicle travels or brakes, the existing drum brake may check positions of the drum 100, the brake shoe 200, and the pad 300.

While the vehicle travels, the brake shoe 200 may be adjusted such that an outer circumferential surface of the pad 300 attached to the brake shoe 200 is spaced from the inner circumferential surface of the drum 100 by a preset distance. Accordingly, the drum 100 fixed to the wheel may rotate freely.

To brake the vehicle traveling, the brake shoe 200 may move outward by a preset distance. Accordingly, the outer circumferential surface of the pad 300 attached to the brake shoe 200 may be in close contact with the inner circumferential surface of the drum 100 to rub against the inner circumferential surface of the drum 100.

However, when the pad 300 rubs against the drum 100, internal temperature and pressure of the drum 100 may inevitably rise significantly. Accordingly, the drum 100 made of a thermal expansion material may expand as denoted by dotted lines in FIG. 3, whereas the brake shoe 200 made of one material may not expand by a degree by which the drum 100 expands thermally. More specifically, when the pad 300 rubs against the drum 100 upon braking of the vehicle, a side wall of the drum 100, rubbing against the pad 300, may expand outward to form a gap between the inner circumferential surface of the drum 100 and the outer circumferential surface of the pad 300.

Due to the gap formed between the pad 300 and the drum 100 during braking of the vehicle, the pad 300 may fail to completely contact the drum 100 and vibrations of components may be caused. The vibrations may generate noise of the brake and deteriorate a braking force of the brake.

According to an embodiment of the disclosure, the brake shoe 200 may include an expansion portion 210 that expands thermally to compensate the gap formed between the pad 300 and the drum 100 that expands thermally.

Figure 5:
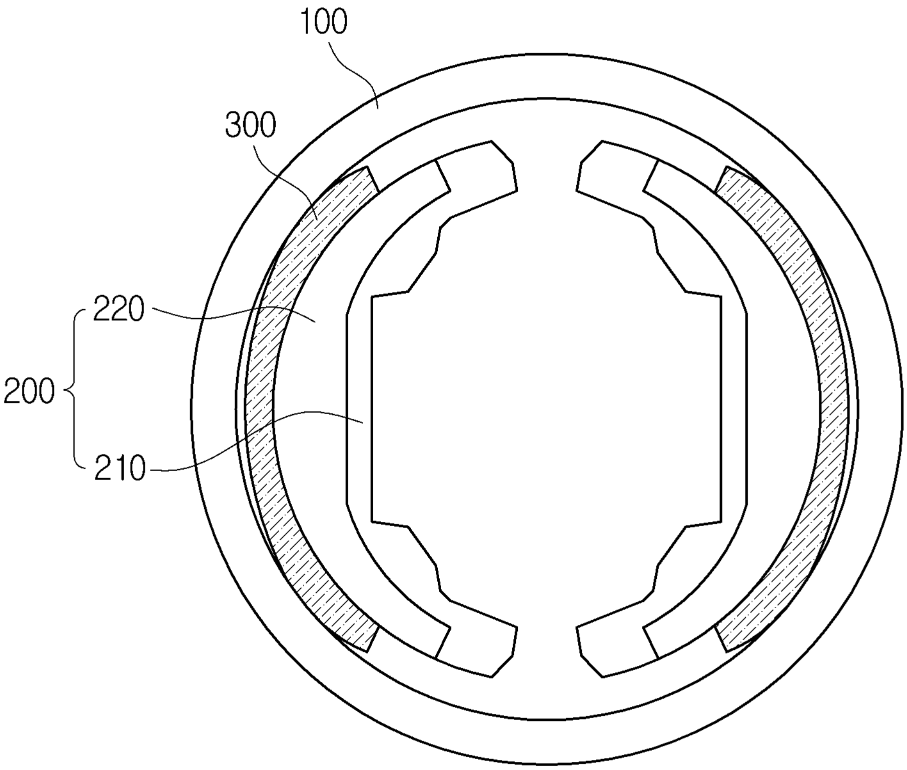
FIG. 5 is a front view of a drum brake according to a first embodiment of the disclosure.
Figure 6:
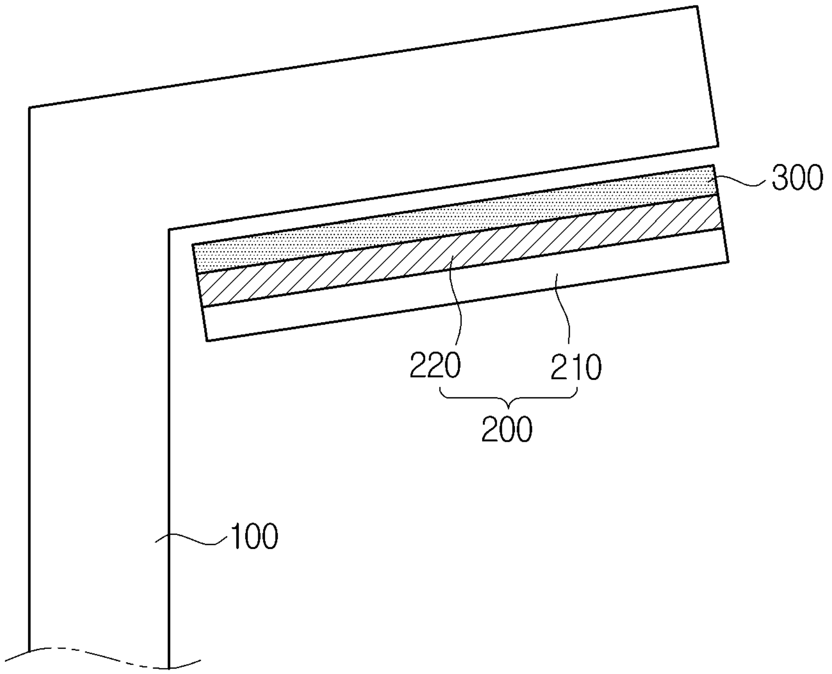
FIG. 6 is an enlarged view of a portion corresponding to the A area of FIG. 2 in the drum brake according to the first embodiment of the disclosure.

FIG. 5 is a front view of a drum brake according to a first embodiment of the disclosure, and FIG. 6 is an enlarged view of a portion corresponding to the A area of FIG. 2 in the drum brake according to the first embodiment of the disclosure, wherein the A area of FIG. 2 may be a portion at which the drum 100 contacts the pad 300.

Referring to FIGS. 5 and 6, a brake shoe 200 according to a first embodiment of the disclosure may include a body portion 220 and an expansion portion 210 that are made of different materials, unlike the brake shoe 200 made of one material in the existing drum brake.

The body portion 220 may be a component forming an outer appearance of the brake shoe 200, and may be made of a material which is different from a material of the expansion portion 210.

The expansion portion 210 may be made of a material that is different from the material of the body portion 220, wherein the material of the expansion portion 210 may be a material that expands thermally in a radial direction under a high-temperature and high-pressure condition.

More specifically, the material constituting the expansion portion 210 may be selected to compensate a gap formed between the inner circumferential surface of the drum 100 and the outer circumferential surface of the pad 300 due to an increase of internal temperature of the drum 100 upon braking of the vehicle in correspondence to a degree of thermal expansion of the drum 100.

The expansion portion 210 may be made of a material having relatively small stiffness and a relatively great thermal expansion coefficient compared to the body portion 220. Accordingly, the brake shoe 200 may secure durability through the body portion 220 and prevent braking performance deterioration of the brake through the expansion portion 210.

For example, the body portion 220 may be made of a material including iron, and the expansion portion 210 may be made of a material including at least one of aluminum, copper, zinc, or a nickel-iron alloy.

The expansion portion 210 may be positioned to one side of the body portion 220. More specifically, the body portion 220 according to the first embodiment of the disclosure may have a semicircular shape, and the expansion portion 210 may extend in a circumferential direction to be positioned alongside of an outer circumferential surface of the body portion 220 and be in contact with an inner circumferential surface of the body portion 220.

However, the body portion 220 and the expansion portion 210 according to the disclosure are not limited to the shape and arrangement structure according to the first embodiment, and the body portion 220 and the expansion portion 210 may include shapes and arrangement structures of all body portions 220 and expansion portions 210 provided in the brake shoe 200 to compensate a gap between the pad 300 and the drum 100 that expands thermally upon braking of the vehicle. For example, the expansion portion 210 may be positioned inside the body portion 220, or an entire of the brake shoe 200 may be provided as the expansion portion 210.

Figure 7:
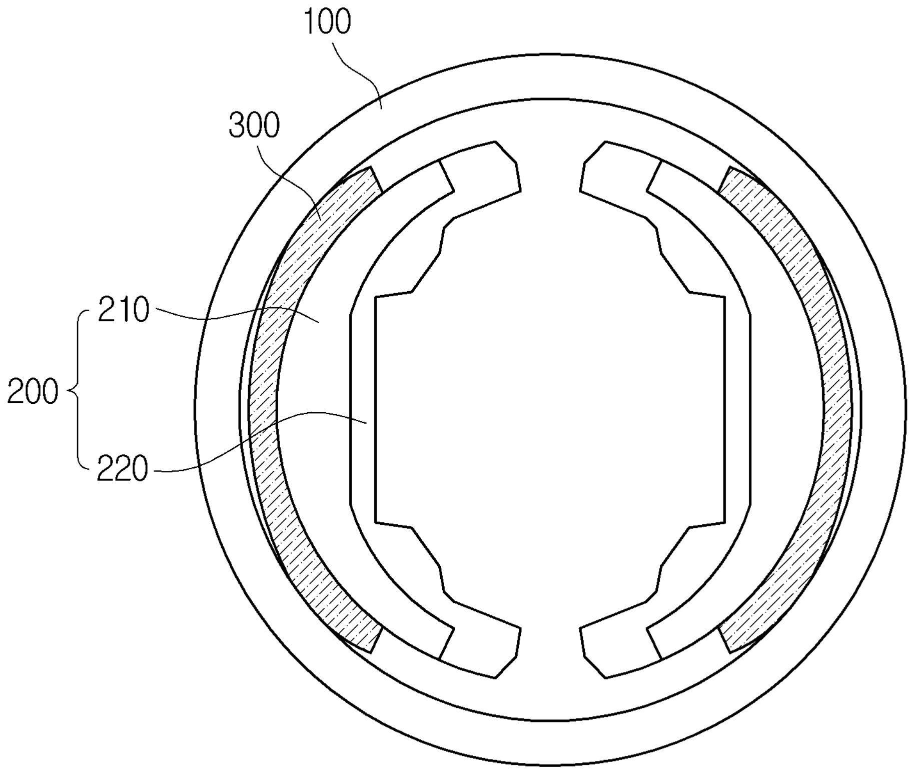
FIG. 7 is a front view of a drum brake according to a second embodiment of the disclosure.
Figure 8:
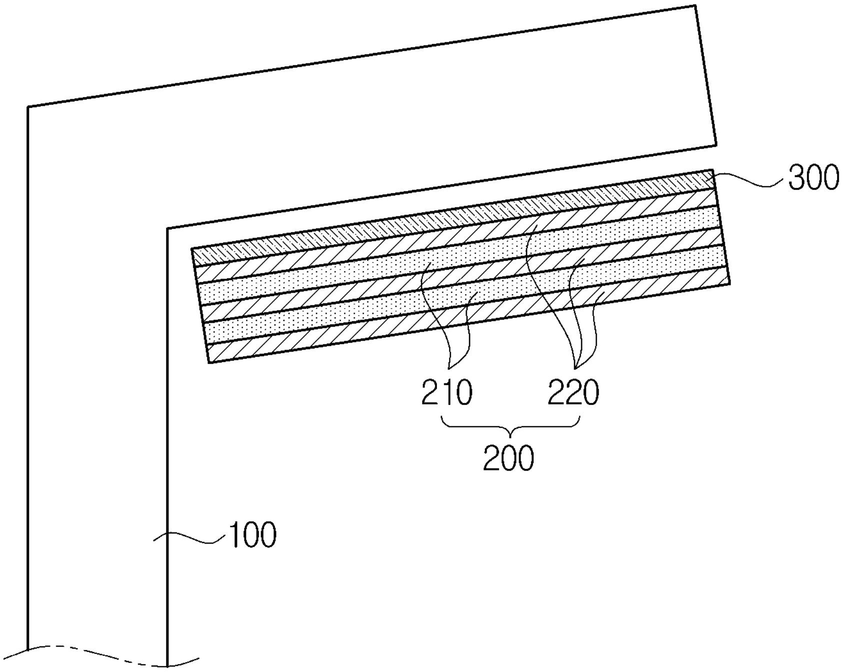
FIG. 8 is an enlarged view of a portion corresponding to the A area of FIG. 2 in the drum brake according to the second embodiment of the disclosure.

FIG. 7 is a front view of a drum brake according to a second embodiment of the disclosure, and FIG. 8 is an enlarged view of a portion corresponding to the A area of FIG. 2 in the drum brake according to the second embodiment of the disclosure.

Referring to FIGS. 7 and 8, in the drum brake according to the second embodiment of the disclosure, the brake shoe 200 may include a plurality of expansion portions 210, unlike the first embodiment.

The following descriptions about the drum brake according to the second embodiment of the disclosure may be the same as those about the drum brake according to the first embodiment described above, except for descriptions given with reference to different reference numerals. Accordingly, the same content of the second embodiment as that of the first embodiment will be not described to avoid duplication.

A plurality of expansion portions 210 may be provided. The plurality of expansion portions 210 may have different thicknesses, and may be respectively made of materials having different thermal expansion coefficients. Because internal temperature of the brake shoe 200 rises by different degrees according to its parts upon braking of the vehicle, the plurality of expansion portions 210 may be designed to effectively compensate a gap compared to the expansion portion 210 provided as one body.

All of the plurality of expansion portions 210 may be positioned inside the body portion 220. The plurality of expansion portions 210 may be arranged in the radial direction. In this case, the plurality of expansion portions 210 may be stacked or spaced from each other. The expansion portions 210 may be arranged at regular intervals or at irregular intervals.

Figure 9:
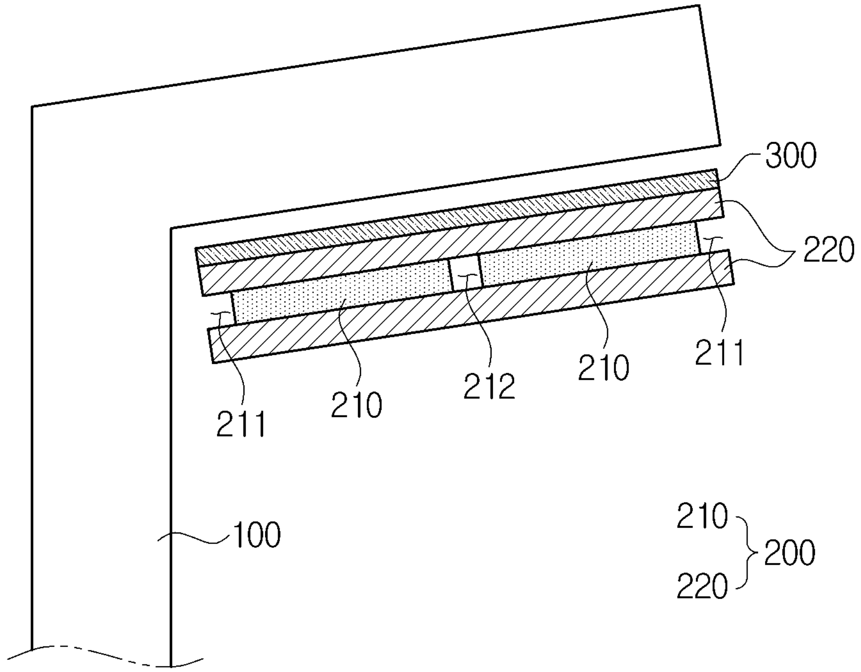
FIG. 9 is an enlarged view of a portion corresponding to the A area of FIG. 2 in a drum brake according to a third embodiment of the disclosure.

FIG. 9 is an enlarged view of a portion corresponding to the A area of FIG. 2 in a drum brake according to a third embodiment of the disclosure.

Referring to FIG. 9, in the drum brake according to the third embodiment of the disclosure, an expansion portion 210 of a brake shoe 200 may include a first space 211 and a second space 212, unlike the first embodiment.

The following descriptions about the drum brake according to the third embodiment of the disclosure may be the same as those about the drum brake according to the first embodiment described above, except for descriptions given with reference to different reference numerals. Accordingly, the same content of the third embodiment as that of the first embodiment will be not described to avoid duplication.

A plurality of expansion portions 210 may be arranged in the circumferential direction. In this case, the plurality of expansion portions 210 may be spaced from each other. That is, the second space 212 may be provided between neighboring ones of the expansion portions 210.

The first space 211 may be provided at an end of an expansion portion 210 positioned at a side because a length in circumferential direction of the expansion portion 210 is shorter than a length in circumferential direction of the body portion 220. The first space 211 may be provided even in a case in which a single expansion portion 210 is provided or a case in which a plurality of expansion portions 210 are arranged in the radial direction.

More specifically, in the drum brake according to the third embodiment of the disclosure, two expansion portions 210 may be arranged in the circumferential direction. In this case, the second space 212 may be provided at inner sides of the two expansion portions 210, and the first space 211 may be provided at outer sides of the two expansion portions 210.

Accordingly, upon braking of the vehicle, the expansion portion 210 may rise in temperature and expand thermally. At this time, expansion of the expansion portion 210 in the radial direction may compensate a gap formed between the inner circumferential surface of the drum 100 and the outer circumferential surface of the pad 300, and the expansion portion 210 may expand in the circumferential direction toward the first space 211 or the second space 212.

However, the body portion 220 forming the first space 211 or the second space 212 according to the disclosure is not limited to the shape, number, and arrangement structure according to the third embodiment, and may include all shapes, numbers, and arrangement structures forming the first space 211 or the second space 212 capable of compensating thermal expansion of the expansion portion 210 in the circumferential direction.

Figure 10:
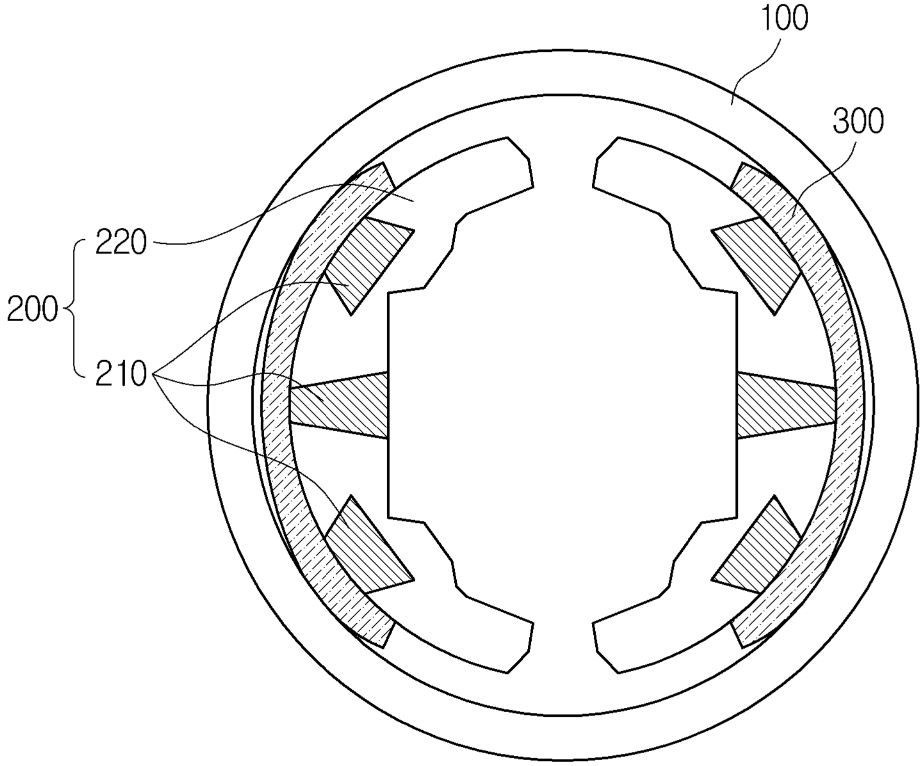
FIG. 10 is a front view of a drum brake according to a fourth embodiment of the disclosure.
Figure 11:
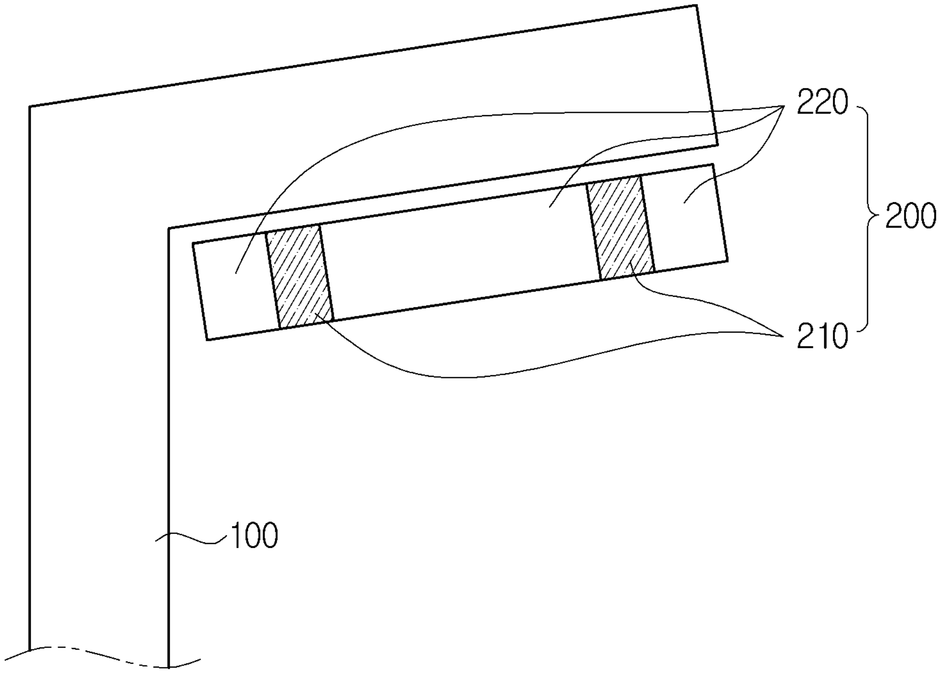
FIG. 11 is an enlarged view of a portion corresponding to the A area of FIG. 2 in the drum brake according to the fourth embodiment of the disclosure.

FIG. 10 is a front view of a drum brake according to a fourth embodiment of the disclosure, and FIG. 11 is an enlarged view of a portion corresponding to the A area of FIG. 2 in the drum brake according to the fourth embodiment of the disclosure.

Referring to FIGS. 10 and 11, in the drum brake according to the fourth embodiment of the disclosure, an expansion portion 210 of a brake shoe 200 may expand in the radial direction, unlike the first embodiment.

The following descriptions about the drum brake according to the fourth embodiment of the disclosure may be the same as those about the drum brake according to the first embodiment described above, except for descriptions given with reference to different reference numerals. Accordingly, the same content of the fourth embodiment as that of the first embodiment will be not described to avoid duplication.

The expansion portion 210 may extend in the radial direction to be perpendicular to the outer circumferential surface of the body portion 220. In this case, an end of the expansion portion 210 toward the pad 300 may be in contact with an inner surface of the pad 300.

A plurality of expansion portions 210 may be provided with different lengths in the radial direction. In other words, any one of the expansion portions 210 may be in contact with the pad 300 at one end while being in contact with the body portion 220 at another end, and any other one of the expansion portions 210 may be in contact with the pad 300 at one end while penetrating the body portion 200 at another end.

Accordingly, the expansion portions 210 may be in contact with the body portion 220 at both sides, and when the expansion portions 210 and the body portion 220 expand thermally, the expansion portions 210 may more expand thermally than the body portion 220 to be easily fixed to inside of the body portion 220.

Each expansion portion 210 may extend with different widths in the radial direction. In other words, each expansion portion 210 may have a small width at an end toward the pad 300 and have a great width at an opposite end. Accordingly, the expansion portion 210 may be more stably fixed to the inside of the body portion 220.

A plurality of expansion portions 210 may be provided along the side wall of the drum 11, as shown in FIG. 11. The plurality of expansion portions 210 may be stacked along the side wall, or spaced from each other as shown in FIG. 11.

As such, in the drum brake according to an embodiment, because the brake shoe 200 includes the expansion portion 210, a gap formed between the inner circumferential surface of the drum 100 and the outer circumferential surface of the pad 300 provided in the brake shoe 200 due to thermal expansion of the drum 100 upon braking of the vehicle may be compensated. Accordingly, the drum brake according to an embodiment of the disclosure may prevent the drum 10 expanded thermally upon braking from failing to completely contact the pad 300, thereby preventing deterioration of brake performance, preventing life damage, preventing vibrations and noise of the brake, and improving productivity and economy of the brake through a simple structure.

An embodiment of the disclosure may provide a drum brake for preventing deterioration of brake performance.

An embodiment of the disclosure may provide a drum brake for preventing deterioration of brake performance, caused by thermal expansion of the drum brake.

An embodiment of the disclosure may provide a drum brake for preventing vibrations and noise caused by thermal expansion of the drum brake.

An embodiment of the disclosure may provide a drum brake for improving productivity and economy of the brake by preventing deterioration of brake performance through a simple structure.

What is claimed is:

1. A drum brake comprising:
a drum configured to rotate together with a wheel;
a pair of brake shoes positioned inside the drum and configured to move to an inner circumferential surface of the drum by a wheel cylinder; and
a pad attached to an outer circumferential surface of each brake shoe and configured to rub against the inner circumferential surface of the drum when the brake shoe operates outward,
wherein the brake shoe comprises an expansion portion made of a material that expands thermally in a radial direction and configured to compensate a gap formed between the pad and the drum expanding thermally,
wherein the brake shoe further includes a body portion made of a material that is different from a material of the expansion portion,
wherein the body portion has a semicircular shape, and
the expansion portion extends in a circumferential direction of the brake shoe to be positioned alongside of an outer circumferential surface of the body portion,
wherein a length in circumferential direction of the expansion portion is shorter than a length in circumferential direction of the body portion, and a first space is formed at an end of the expansion portion such that the expansion portion expands thermally in the circumferential direction of the brake shoe toward the first space upon braking of a vehicle.

2. The drum brake of claim 1, wherein the expansion portion is made of a material having relatively smaller stiffness and a relatively greater thermal expansion coefficient than the material of the body portion.

3. The drum brake of claim 2,
the body portion is made of a material including iron, and
the expansion portion is made of a material including at least one of aluminum or copper.

4. The drum brake of claim 1, wherein the expansion portion is positioned inside the body portion.

5. The drum brake of claim 1, wherein the expansion portion includes a plurality of expansion portions.

6. The drum brake of claim 5, wherein the plurality of expansion portions are arranged in a radial direction.

7. A drum brake comprising:
a drum configured to rotate together with a wheel;
a pair of brake shoes positioned inside the drum and configured to move to an inner circumferential surface of the drum by a wheel cylinder; and
a pad attached to an outer circumferential surface of each brake shoe and configured to rub against the inner circumferential surface of the drum when the brake shoe operates outward,
wherein the brake shoe comprises an expansion portion made of a material that expands thermally in a radial direction and configured to compensate a gap formed between the pad and the drum expanding thermally,
wherein the brake shoe further includes a body portion made of a material that is different from a material of the expansion portion,
wherein the expansion portion includes a plurality of expansion portions,
wherein the plurality of expansion portions are arranged in a radial direction of the brake shoe,
wherein the plurality of expansion portions are spaced from each other in the radial direction of the brake shoe such that the body portion is positioned between the plurality of expansion portions.

8. The drum brake of claim 5, wherein the plurality of expansion portions are arranged in a circumferential direction.

9. The drum brake of claim 8, wherein the plurality of expansion portions are spaced from each other such that a second space is formed between the plurality of expansion portions.

10. A drum brake comprising,
a drum configured to rotate together with a wheel;
a pair of brake shoes positioned inside the drum and configured to move to an inner circumferential surface of the drum by a wheel cylinder; and
a pad attached to an outer circumferential surface of each brake shoe and configured to rub against the inner circumferential surface of the drum when the brake shoe operates outward,
wherein the brake shoe comprises an expansion portion made of a material that expands thermally in a radial direction and configured to compensate a gap formed between the pad and the drum expanding thermally, wherein the brake shoe further includes a body portion made of a material that is different from a material of the expansion portion, wherein the body portion bas a semicircular shape, and the expansion portion extends in a radial direction to be perpendicular to an outer circumferential surface of the body portion, wherein the expansion portion is in contact with the pad at an end toward the pad, wherein the expansion portion includes a plurality of expansion portions formed with different lengths in a radial direction.

11. The drum brake of claim 5, wherein the plurality of expansion portions are respectively made of materials having different thermal expansion coefficients.

12. The drum brake of claim 5, wherein the plurality of expansion portions are respectively made of materials having different thicknesses.

* * * * *